United States Patent
Elliott et al.

(10) Patent No.: US 11,214,382 B2
(45) Date of Patent: Jan. 4, 2022

(54) METHOD AND APPARATUS FOR OPERATING A POWER DISTRIBUTION SYSTEM

(71) Applicant: GE Aviation Systems Limited, Cheltenham (GB)

(72) Inventors: David Alan Elliott, Gloucester (GB); John Oliver Collins, Cheltenham (GB); Russell Mark Compton, Droitwich Spa (GB)

(73) Assignee: GE Aviation Systems Limited, Cheltenham (GB)

( * ) Notice: Subject to any disclaimer, the term of this patent is extended or adjusted under 35 U.S.C. 154(b) by 21 days.

(21) Appl. No.: 16/381,601

(22) Filed: Apr. 11, 2019

(65) Prior Publication Data
US 2019/0315480 A1    Oct. 17, 2019

(30) Foreign Application Priority Data

Apr. 13, 2018    (GB) .................................... 1806101

(51) Int. Cl.
*B64D 41/00* (2006.01)
*H02J 1/14* (2006.01)
*H02J 4/00* (2006.01)

(52) U.S. Cl.
CPC .............. *B64D 41/00* (2013.01); *H02J 1/14* (2013.01); *H02J 4/00* (2013.01); *B64D 2221/00* (2013.01); *H02J 2310/44* (2020.01); *H02J 2310/60* (2020.01)

(58) Field of Classification Search
CPC .... B60R 16/03; B64D 41/00; B64D 2221/00; H02J 1/14; H02J 3/14; H02J 3/144; H02J 4/00; H02J 11/00; H02J 2310/44; H02J 2310/50; H02J 2310/52; H02J 2310/56; H02J 2310/58; H02J 2310/60
See application file for complete search history.

(56) References Cited

U.S. PATENT DOCUMENTS

| 4,819,180 | A | * | 4/1989 | Hedman | ........... | H02J 13/00004 |
| | | | | | | 700/291 |
| 6,046,513 | A | | 4/2000 | Jouper et al. | | |
| 7,626,797 | B2 | | 12/2009 | Kilroy et al. | | |

(Continued)

FOREIGN PATENT DOCUMENTS

| EP | 1028512 A2 | 9/1999 |
| WO | 2011081943 A2 | 7/2011 |
| WO | 2016178054 A1 | 11/2016 |

OTHER PUBLICATIONS

European Patent Office, European Search Report re Application No. 19168309.3-1202, dated Aug. 21, 2019, 6 pages, Munich, Germany.

(Continued)

*Primary Examiner* — Levi Gannon
(74) *Attorney, Agent, or Firm* — McGarry Bair PC

(57) ABSTRACT

A method and apparatus for operating a power distribution system includes a power converter adapted to receive a power supply and convert the power supply to a power output, a set of solid state switching elements connected with the power output, a set of sensors adapted to sense a power demand at the set of solid state switching elements, and a controller module communicatively connected with the set of sensors and the set of solid state switching elements.

15 Claims, 4 Drawing Sheets

(56) References Cited

U.S. PATENT DOCUMENTS

| | | | |
|---|---|---|---|
| 8,148,842 B2 | 4/2012 | Maier | |
| 8,344,545 B2 | 1/2013 | Fuller et al. | |
| 8,412,966 B2 | 4/2013 | Tofigh et al. | |
| 8,547,675 B2 | 10/2013 | Maier | |
| 9,236,744 B2 | 1/2016 | Shipley et al. | |
| 2004/0057177 A1* | 3/2004 | Glahn | H02J 3/14 361/62 |
| 2005/0107892 A1* | 5/2005 | Matsui | H02J 3/14 700/28 |
| 2009/0152942 A1 | 6/2009 | Waite et al. | |
| 2010/0023786 A1* | 1/2010 | Liberman | H02J 3/14 713/320 |
| 2010/0148579 A1* | 6/2010 | Maloney | H02J 3/14 307/20 |
| 2010/0156178 A1 | 6/2010 | Holmberg | |
| 2010/0172063 A1* | 7/2010 | Liu | H02H 1/04 361/118 |
| 2012/0065792 A1* | 3/2012 | Yonezawa | H02J 3/14 700/291 |
| 2012/0200418 A1* | 8/2012 | Hirosaka | G06F 1/266 340/657 |
| 2013/0090777 A1* | 4/2013 | Lu | H02J 3/14 700/297 |
| 2013/0229050 A1 | 9/2013 | Shipley et al. | |
| 2013/0305071 A1 | 11/2013 | Nilsen et al. | |
| 2014/0217821 A1* | 8/2014 | Rozman | B60L 1/00 307/29 |
| 2015/0138681 A1 | 5/2015 | Mayes | |
| 2017/0222436 A1* | 8/2017 | Wendt | H02J 1/12 |

OTHER PUBLICATIONS

GB Search and Examination Report cited in related GB Application No. 1806101.0, 6 pages, South Wales.

* cited by examiner

METHOD AND APPARATUS FOR OPERATING A POWER DISTRIBUTION SYSTEM

CROSS REFERENCE TO RELATED APPLICATION

This application claims priority to GB 1806101.0, filed Apr. 13, 2018, the entirety of which is incorporated herein by reference.

BACKGROUND

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide voltage step-up or step-down power conversion, direct current (DC) to alternating current (AC) power conversion or AC to DC power conversion, or AC to AC power conversion involving changes in frequency or phase, or switching operations to selectively enable or disable the delivery of power to particular electrical loads, depending on, for example, available power distribution supply, criticality of electrical load functionality, or aircraft mode of operation, such as take-off, cruise, or ground operations. In some configurations, the power distribution nodes can include electrical power components disposed on printed circuit boards.

BRIEF DESCRIPTION

In one aspect, the present disclosure relates to a method of operating a power distribution system including a power converter having a power demand threshold, including receiving, in a controller module, a set of present power demands from a set of solid state switching elements, summating the set of present power demands in the controller module, comparing the summated set of present power demands with the power demand threshold, and when the comparison satisfies the power demand threshold, dynamically limiting a maximum current for at least a subset of solid state switching elements. The set of solid state switching elements are connected downstream of the power converter.

In another aspect, the present disclosure relates to a power distribution system including a power converter adapted to receive a power supply and convert the power supply to a power output, a set of solid state switching elements connected with the power output, a set of sensors adapted to sense a power demand at the set of solid state switching elements, and a controller module communicatively connected with the set of sensors and the set of solid state switching elements. The controller module is adapted to obtain the set of sensed power demands, summates the set of sensed power demands, and compares the summated power demand with a maximum power demand threshold for the power converter, and when the comparison satisfies the power demand threshold, controllably limits a maximum current for at least a subset of solid state switching elements.

In yet another aspect, the present disclosure relates to a method of operating a power distribution system, including receiving, in a controller module, a set of power demands from a set of power sensors associated with a respective set of controllably switchable elements, comparing the set of power demands with a power demand criteria, and when the comparison satisfies the power demand criteria, controllably limiting, by the controller module, at least a subset of switchable elements such that a maximum delivered power from a power converter remains less than the power demand criteria.

DETAILED DESCRIPTION

Figure 1:
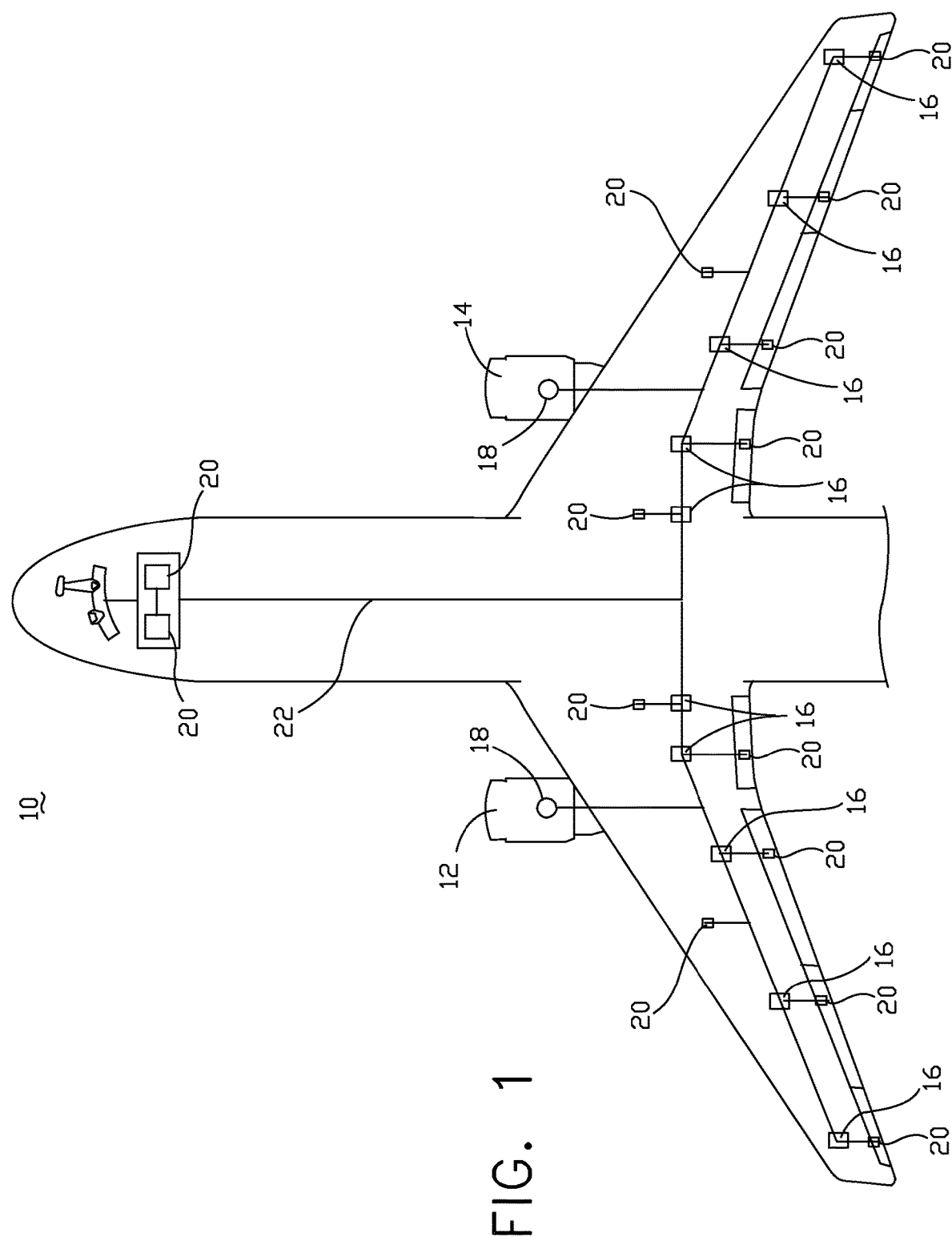
FIG. 1 is a top down schematic view of the aircraft and power distribution system in accordance with various aspects described herein.

The described aspects of the present disclosure are directed to an electrical power distribution system or power distribution node for an aircraft, which enables production and distribution of electrical power, such as from a gas turbine engine driven generator, to the electrical loads of the aircraft. It will be understood that while aspects of the disclosure are shown in or intended for in-situ use of an aircraft environment, the disclosure is not so limited and has general application to electrical power systems in non-aircraft applications, such as other mobile applications and non-mobile industrial, commercial, and residential applications. Aspects of the disclosure can be further applicable to provide power, supplemental power, emergency power, essential power, or the like, in otherwise non-emergency operations, such as takeoff, landing, or cruise flight operations.

While "a set of" various elements will be described, it will be understood that "a set" can include any number of the respective elements, including only one element.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations. Non-limiting aspects of the disclosure are directed to limiting the delivering, supplying, providing, or the like, of power from a source to an electrical load. Furthermore, non-limiting aspects of the disclosure primarily describe controlling aspects of the power delivering by way of current-limiting operations. It will be understood that current-limiting operations are merely one example of power delivery control. Non-limiting aspects of the disclosure can include voltage-limiting operations for power delivery control, or a combination of voltage and current-limiting operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Aspects of the disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device. One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included. SSPCs can further include operational functionality including, but not limited to, current limiting, overcurrent protection, trip functions (i.e. opening the switchable element in response to a value out of expected range), or the like.

The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The left and right engine systems 12, 14 can further include additional power sources (not shown). Non-limiting aspects of the disclosure can be included wherein, for example, the generator 18 is a primary power source. The aircraft is shown further having a set of power-consuming components, or electrical loads 20, such as for instance, an actuator load, flight critical loads, and non-flight critical loads.

The electrical loads 20 are electrically coupled with at least one of the generators 18 via a power distribution system including, for instance, power transmission lines 22 or bus bars, and power distribution nodes 16. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the set of generators 18. The set of generators 18, in turn, generate power, such as alternating current (AC) or direct current (DC) power, and provides the generated power to the transmission lines 22, which delivers the power to the electrical loads 20, positioned throughout the aircraft 10. In one non-limiting aspect of the disclosure, at least one of the set of generators 18 can include a variable frequency generator configured or selected to generate AC power. Non-limiting examples of the power generated by the set of generators 18 can include 115 volts AC power at 400 Hz or 270 volts DC power. In non-limiting examples, the power generated by the set of generators 18 can be converted, altered, modified, or the like, prior to distribution via the transmission lines 22.

Example power distribution management functions can include, but are not limited to, selectively enabling or disabling the delivery of power (e.g. energizing) to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while one aspect of the disclosure is shown in an aircraft environment, the disclosure is not so limited and has general application to electrical power systems in non-aircraft applications, such as other mobile applications and non-mobile industrial, commercial, and residential applications.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
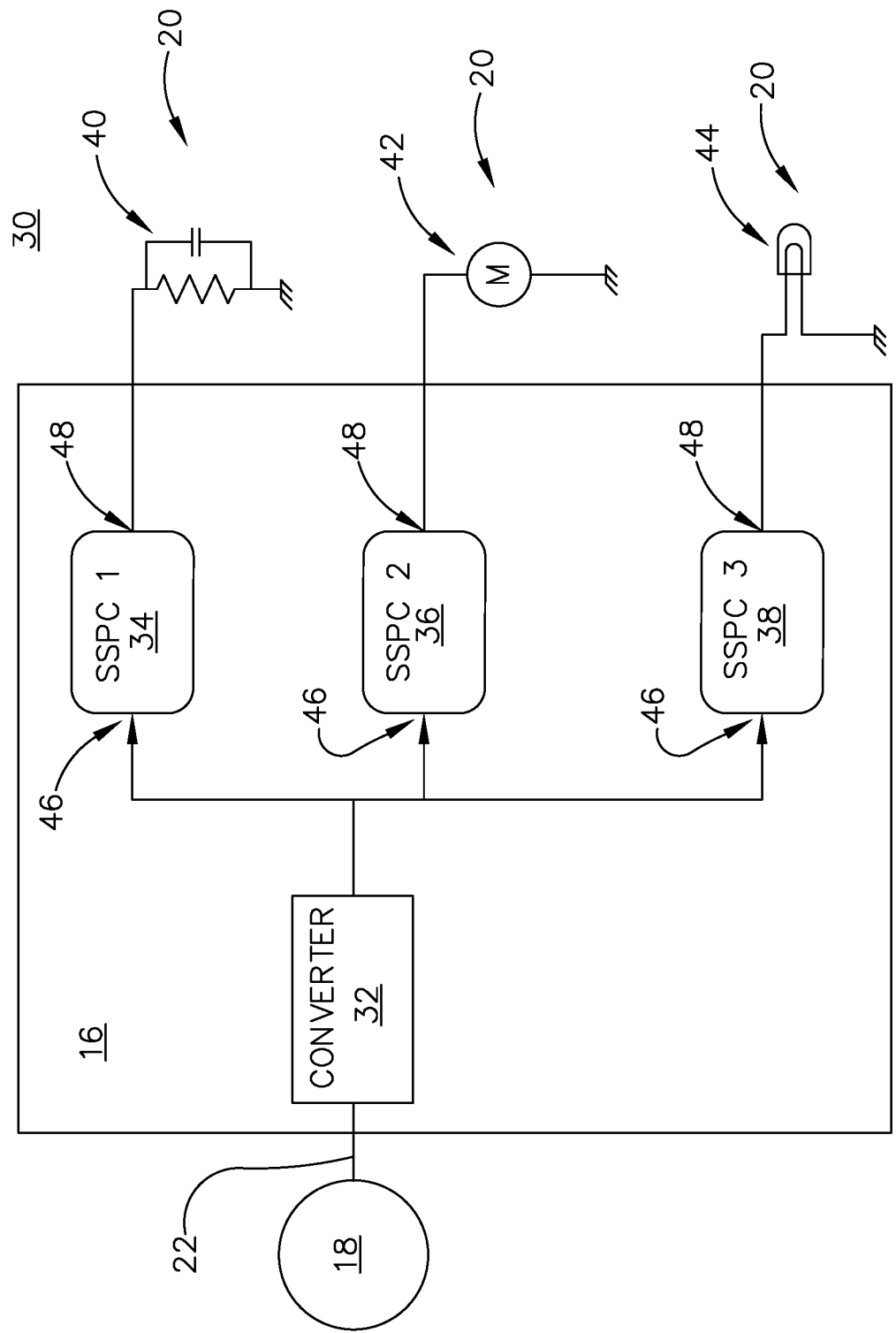
FIG. 2 illustrates an example schematic view of the power distribution system of FIG. 1, in accordance with various aspects described herein.

FIG. 2 illustrates a schematic view of a power distribution system 30, in accordance with aspects described herein. As shown, a power source, such as the generator 18 can be connected with the power distribution node 16 by way of the transmission lines 22. The power distribution node 16 can include a power converter 32 connected with the generator 18. The power distribution node 16 can further include a set of solid state power controllers (SSPCs), shown as a first SSPC 34, a second SSPC 36, and a third SSPC 38. Each respective SSPC 34, 36, 38 can be electrically connected with the power converter 32 at an SSPC input 46, and can further be connected with a respective electrical load 20 at an SSPC output 48. The set of SSPCs 34, 36, 38 can operably control the energizing or de-energizing of the respective electrical load by selectively or controllably operating a switchable element to connect or disconnect the load 20 from the power source. Each of the set of SSPCs 34, 36, 38 can operate independently, or as a commonly-operated group. The control schema for operating each independent SSPC 34, 36, 38 is not shown, for brevity.

While a set of three SSPCs 34, 36, 38 connected with three respective electrical loads 20 are illustrated, any number of SSPCs 34, 36, 38, electrical loads 20, or a combination thereof can be included in aspects of the disclosure. The illustration is merely one non-limiting example configuration of the power distribution system 30. Non-limiting examples of the electrical loads 20 can include a resistor capacitor (RC) load 40, a motor 42, and a light emitting device 44.

The power converter 32 can be configured, adapted, selected, or the like, to convert a first power received from the power source, such as the generator 18 via the transmission lines 22, to a second power provided to the set of SSPCs 34, 36, 38. In this sense, the first power and the converted second power can include different electrical characteristics, including, but not limited to, voltage levels, current amounts, power type (e.g. AC or DC), frequency, or a combination thereof. In one non-limiting example, the power converter 32 can convert 270 volt DC power received from the transmission lines 22 to 28 volt DC power supplied to the inputs 46 of the set of SSPCs 34, 36, 38.

Aspects of the power converter 32 can further include predefined electrical characteristics or ratings for the power converter 32. For instance, the power converter 32 can be "rated" (e.g. certified, cleared, intended for use, or the like) for a maximum or threshold quantity or amount of power, voltage, current, or the like. In one non-limiting example, a power converter 32 can be rated for up to 1 kilowatt of power conversion, that is, the downstream SSPCs 34, 36, 38, or the downstream electrical loads 20 can consume up to 1 kilowatt of power delivered via the power converter 32. In another non-limiting example, the power converter 32 can include a maximum or threshold quantity or amount of power, voltage, current, or the like, in the form of a fixed value (e.g. a non-time-limited, power or current flow capability of the converter 32 to meet the "worst case", maximum short-term transient total demand from all of the attached loads indefinitely) or a dynamic threshold (adaptable to meet transient demands using energy stored in "reservoirs", as described herein), or based on a fixed or dynamic threshold profile (e.g. such as based on varying factors such as thermal or time-based considerations). The predefined electrical characteristics or ratings of the power converter 32 can further affect the size, weight, volume, costs, or a combination thereof, of the power converter 32, where generally, larger ratings relate to larger converters 32.

The set of electrical loads 20 can consume power in at least two different operating schemas: normal (or continuous) operation, wherein the quantity or amount of power consumed is generally predictable and consistent, and transient, temporal, or temporary periods of operation, wherein a subset of loads will demand or consume a larger amount of power, compared with the normal operation power consumption. The transient periods of operation can originate from particular load operating conditions.

For instance, in one non-limiting example, a capacitance between the power feed and the power feed return (such as the RC load 40) can result in a high power transient electrical load. In this example, an intrinsic capacitance between adjacent wires, chassis etc., an extrinsic capacitor fitted for a number of reasons including electro-magnetic interference (EMI) filtering and power decoupling, or a combination of both intrinsic and extrinsic capacitances can result in a high power transient electrical load. In another non-limiting example, a tungsten filament-based light bulb (such as the light emitting device 44) can include a cold resistance (when light is off) which is much lower than the hot resistance (when light is on). Thus, switching on the aforementioned light bulb can require or demand a high power transient electrical load, compared with the demand to keep the bulb lit.

In another non-limiting example, an electric motor (such as the motor 42) can include a high power transient 'stall current' during starting operations higher than the 'running current,' due to the motor acting as a generator to internally produce a voltage opposing the supply voltage during starting, compared with during continuous running operations. In yet another non-limiting example, a coil of an electrical contactor with a built-in 'economiser' circuit can allows a relatively high transient current to flow for a short time (e.g. 1 second) when the coil power is applied to ensure that the contactor mechanism operates, before reducing to a lower current which greatly reduces the power requirement and dissipation requirements whilst being sufficient to keep the mechanism in the operated position. In yet another example, transient power demands can vary by a considerable amount for certain electrical loads 20 depending on factors such as environmental temperature, mechanical wear, oil viscosity, bearings, friction, or the like.

In some instances, the combined power demand during a set of electrical load 20 operations, such as when one or more of the electrical loads 20 can be operating with in a high power transient demand, can exceed the threshold quantity or amount of power for the power converter 32. Exceeding the threshold quantity or amount of power for the power converter 32 can result in undesirable consequences for the power distribution system 30, including but not limited to, saturation of inductors, overcurrent stress inducing early failure (particularly through internal components such as transistors and diodes), overheating of components, or a drop of output voltage causing other electrical loads 20 supplied by the power converter 32 to operate outside of expected functionality. For example, a subset of electrical loads 20 including power input voltage monitoring (e.g. power supplies) may power down in response to a drop in power supply from the power converter 32. In other non-limiting examples, light emitting devices 44 can dim or flicker, motors 42 can slow down or stall, or contactors and relays can unexpectedly or undesirably change state in response to a drop in power supply from the power converter 32. In yet another non-limiting example, the resulting reduction in electrical loads 20 or electrical load 20 operations caused by the voltage drop can in turn cause the voltage or the power supply to rise and the current demand to increase, such that the whole power distribution system 30 can start to oscillate in a repeating or non-repeating pattern.

Thus, non-limiting aspects of the disclosure can include configurations such that each respective SSPC 34, 36, 38 can include a predetermined maximum current threshold for the allocated electrical load 20. In this sense, the respective SSPC 34, 36, 38 can controllably operate by way of the switching element such that the respective electrical load 20, such as a motor 42, will always receive up to a maximum current supply from the generator 18 (e.g. via the power converter 32), regardless of the power demanded by the load 20. Non-limiting examples of the maximum current supply for a respective SSPC 34, 36, 38 can be based at least partially on, for example, an overcurrent wiring protection consideration, a "trip" rating or function, as explained herein, "overrating" the maximum current supply (that is, raising the maximum current supply to prevent false tripping during normal usage or switching operations), temporal considerations thereof, or a combination thereof. While aspects of the SSPCs 34, 36, 38 are described with a maximum current "supply", it will be understood that reference to the "supply" is made with respect to power delivered from the respective SSPC 34, 36, 38 output to the set of electrical loads 20. In this sense, the SSPCs 34, 36, 38 do not "generate" a "supply" of current, power or the like, but rather deliver, provide, communicate, or the like, the power received from an upstream source (for instance, a generator 18 or power converter 32). In this sense, the maximum current supply can operate as a throttle, or limitation to power or current passing through the respective SSPC 34, 36, 38.

Collectively, the set of SSPCs 34, 36, 38 can define a set of maximum current thresholds, for example, a maximum current threshold associated with each respective SSPC 34, 36, 38, such that the summation of the maximum current thresholds (i.e. the maximum combined instantaneous current allowed for the power distribution node 16, regardless of the power demanded by the set of the electrical loads 20), does not exceed the threshold quantity or total amount of power for the power converter 32. Stated another way, the aforementioned aspects of the disclosure can ensure the instantaneous current demand for the set of electrical loads 20 always remains within or less than the power converter's 32 rated capabilities. Thus, the set of SSPCs 34, 36, 38 (assumed to be fault-free) can set the maximum total current demand that can be experienced by the power converter 32 output under any conditions, including faulty electrical loads 20. To ensure that all fault-free electrical loads 20 can receive a continuous supply, the power converter 32 must be rated to meet this maximum demand. For aspects of the illustrated example of FIG. 2, this 'maximum current demand' is the total of all of the SSPC maximum current or maximum power ratings.

In this example, the set of SSPCs 34, 36, 38, or the maximum current threshold for each respective SSPC 34, 36, 38 can be tailored to, selected for, or predetermined based on the corresponding electrical load 20, the power converter 32 ratings, or a combination thereof. In another non-limiting example, the power converter 32 ratings can be tailored to, selected for, or predetermined based on the corresponding set of electrical loads 20, the set of SSPC 34, 36, 38, or the maximum current thresholds of the respective set of SSPCs 34, 36, 38. Non-limiting examples of controllably activity for limiting the maximum current threshold for each respective SSPC 34, 36, 38 can include active current limiting modes of operation, such as pulse-width modulation control schema, load shedding due to high transient power demands, or the like, and are not germane to the disclosure. However, as shown in FIG. 2, controllably activity for limiting the maximum current threshold for each respective SSPC 34, 36, 38 is not centralized or communicative between components of the power distribution node 16. In this sense, each respective SSPC 34, 36, 38 operates independently of one another.

Figure 3:
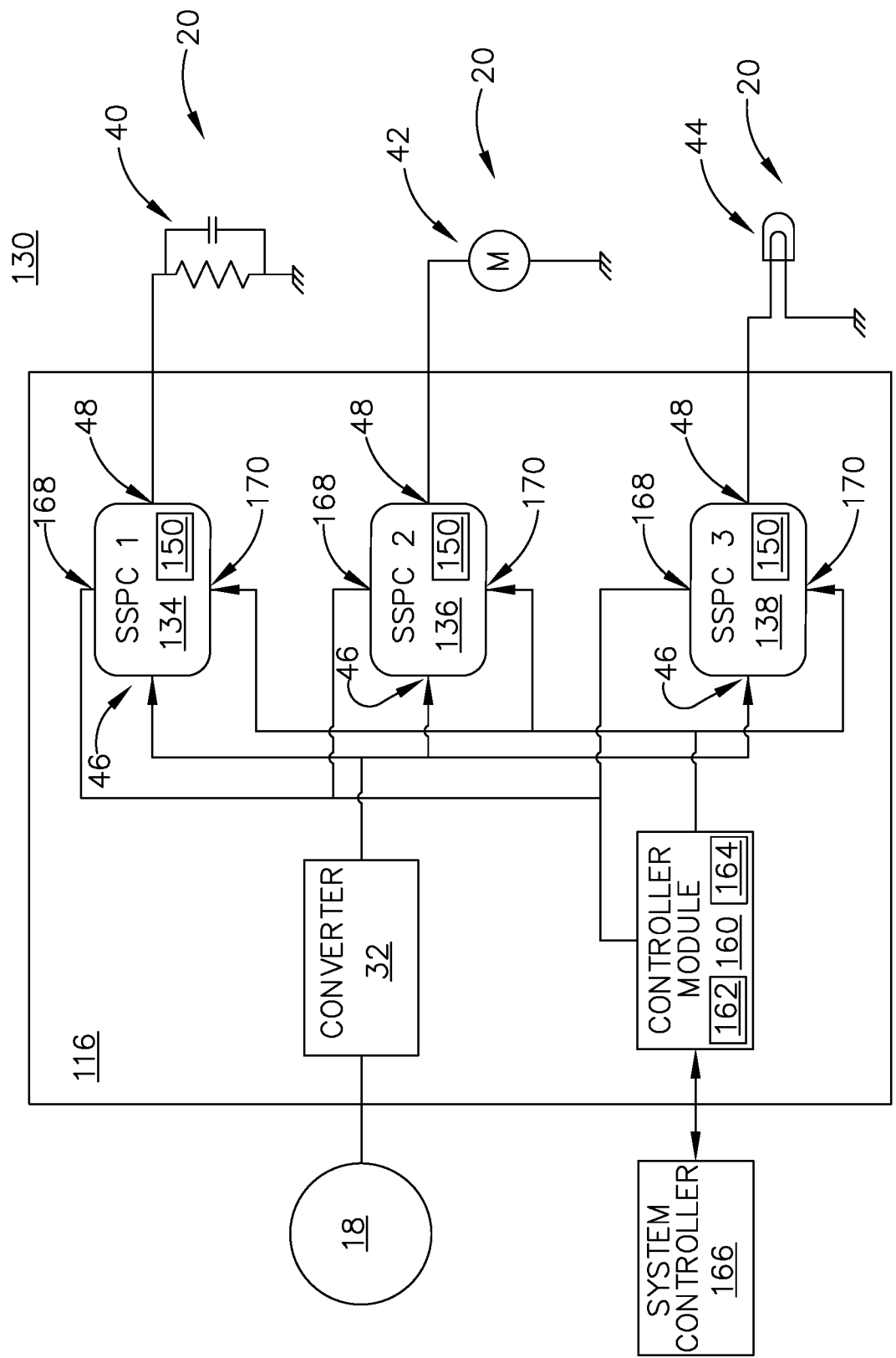
FIG. 3 illustrates another example schematic view of the power distribution system of FIG. 1, in accordance with various aspects described herein.

FIG. 3 illustrates a schematic view of another power distribution system 130, in accordance with aspects described herein. The power distribution system 130 is similar to the power distribution system 30; therefore, like parts will be identified with like numerals increased by 100, with it being understood that the description of the like parts of the power distribution system 30 applies to the power distribution system 130, unless otherwise noted. One difference is that the each respective SSPCs 134, 136, 138 can include a sensor 150, such as a power sensor. Non-limiting examples of the sensor 150 can include a current sensor, a voltage sensor, or the like, and can be arranged, adapted, or otherwise configured to sense or measure the amount of power, current, or the like provided or demanded via the respective SSPC 134, 136, 138 to the respective electrical load 20.

The power distribution system 130 can also include a controller module 160 having a processor 162 and memory 164 communicatively connected with the set of SSPCs 134, 136, 138 or the set of sensors 150. In this sense, the set of sensors 150 can provide, or the controller module 160 can obtain, a respective sensed power output 168 of each respective SSPC 134, 136, 138. The controller module 160 can also be communicatively connected with set of SSPCs 134, 136, 138 and provide, or the set of SSPCs 134, 136, 138 can obtain, a control input 170 from the controller module 160. In one non-limiting aspect, the controller module 160 can be further communicatively connected with another power or system controller 166 remote from the power distribution node 116. In one non-limiting example, the system controller 166 can be adapted, enabled, or otherwise configured to controllably operate a set of power distribution nodes 116 or aspects of the power distribution system 130. For instance, the system controller 166 can include additional information of operational characteristic values to the power distribution node 116, such as control schema aspects related to the flight phase or environmental operating characteristic of the aircraft, which may affect the energizing of electrical loads 20 or prioritization of such.

Non-limiting aspects of the power distribution system 130 can include the power converter 32 having the maximum or threshold quantity or amount of power, as described herein. Additionally, non-limiting aspects of the power distribution system 130 can include each respective SSPC 134, 136, 138 having a respective maximum current threshold. However, non-limiting aspects of the power distribution system 130 can include operations wherein, for example, the power delivered, provided, supplied, demanded, or the like, at each respective SSPC 134, 136, 138 can be sensed by the sensor 150 and provided via the sensed power output 168 to the controller module 160. The controller module 160, processor 162, or system controller 166 can be configured to summate the power delivered, provided, supplied, demanded, or the like, at each respective SSPC 134, 136, 138, and compare the summated power with the maximum or threshold quantity or amount of power for the power converter 32. This comparison can ensure that the power delivered, provided, supplied, demanded, or the like, remains at or below the threshold quantity of the power converter 32. For instances, in non-limiting examples, the comparison can result in a true or false indicator, and the comparison output can ensure that the power delivered, or the like, remains at or below the threshold quantity of the power converter 32.

In another non-limiting aspect of the disclosure, during periods of high transient power demands by a subset of the electrical loads 20, the controller module 160, processor 162, or system controller 166 can further controllably operate the current limiting functionality of the set of SSPCs 134, 136, 138. For instance, during transient periods of operation wherein the summation of the total power demand for the set of SSPCs 134, 136, 138 would exceed the maximum threshold for the power converter 32, the controller module 160, processor 162, or system controller 166 can control a subset of the SSPCs 134, 136, 138, for example, via the control input 170, to dynamically limit the power or current supply or flow of the subset of SSPCs 134, 136, 138. The dynamic limiting can include, but is not limited to, a control input 170 setting a maximum current value, a maximum power value, load shedding instructions, or the like, for the subset of SSPCs 134, 136, 138, such that the summation of the total power demand for the set of SSPCs 134, 136, 138 drops below or does not exceed the maximum threshold for the power converter 32.

In another non-limiting instance, when a specific electrical load 20, such as the motor 42, has a high transient power demand, such as during starting operations, the controller module 160, processor 162, or system controller 166 can control the respective SSPC 136, via the control input 170, to raise or allow a temporary alteration of the maximum current value for the SSPC 136 to enable the starting high transient power demand without tripping the SSPC 136. In one non-limiting example, the controller module 160 can simultaneously raise the maximum current value for a subset of the SSPCs 134, 136, 138 while lowering or limiting the maximum current value another subset of the SSPCs 134, 136, 138, if needed. In yet another example, the controller module 160 can be configured or enabled to allow prioritization of certain electrical loads 20 over other electrical loads 20. For example, a higher-prioritized electrical load 20, such as the motor 42, can receive a higher maximum current value or high transient power demand at the expense of lowering or shedding another lower-prioritized electrical load 20, such as the light emitting device 44. In another non-limiting example, the prioritization can include a phase-in of a temporary alteration in power demanded, in conjunction with a subset of the SSPCs 134, 136, 138, such that in the event two or more SSPCs 134, 136, 138 'request' a-larger or higher, short-time, alteration of power demanded simultaneously, or in an overlapping time relationship, then some form of prioritization will be applied to delay one or more of the SSPC 134, 136, 138 maximum current by a short period of time, so that the simultaneous demand, or overlap, can be reduced or eliminated.

This situation could be particularly common at power up or major flight phase change when a number of systems will be switched at nominally the same moment. As explained herein, with reference to FIG. 3, the "maximum current" threshold or value for each respective SSPC 134, 136, 138 can be less than or greater than the example "maximum current demanded" in FIG. 2, providing one or more of the SSPC 134, 136, 138 (instantaneous) maximum current ratings can be reduced or increased, as explained herein. This could be achieved by any of one or more of several strategies, examples including matching each SSPC 134, 136, 138 trip rating to actual demand, delaying simultaneous transients, shedding non-essential loads, the like, or a combination thereof. The maximum current threshold or value for each respective SSPC 134, 136, 138 can thus be altered (raised or lowered), so long as the summated set of SSPC 134, 136, 138 maximum current thresholds does not exceed the maximum threshold for the power converter 32

For instances, in one example, energizing an electrical load 20 having a power input capacitor can result in a high transient power demand, but can operate satisfactorily if the current flow during power up is limited (e.g. resulting in a longer, but operational power up period). In one non-limiting example, the power input capacitor can be included as a portion of the RC load 40. In this instance, the electrical load 20 having a power input capacitor can be de-prioritized by way of the control schema described herein, as long as the power supply is at least a minimal threshold value to allow or enable the load 20 to operate satisfactorily.

In non-limiting examples, the sensing of the power delivered, provided, supplied, demanded, or the like, by the sensor 150 can occur continuously, periodically, or a combination thereof. While the sensor 150 is illustrated schematically as a subcomponent of the respective SSPC 134, 136, 138, non-limiting aspects of the disclosure can be included wherein the set of SSPCs 134, 136, 138 can include sensing mechanisms inherently included for operational purposes, which can be utilized to sense the power delivered, or the like, as explained herein. The controller module 160, processor 162, or system controller 166 can be configured, adapted, enabled, or otherwise able to analyze the sensed power output 168 from the sensor 150, determine or calculate the summated total of demanded power (or the like), determine or calculate an equitable current limit or maximum current value for a subset of the SSPCs 134, 136, 138 (if needed), and controllably operate the respective subset of the SSPCs 134, 136, 138 in accordance with the current limits, via the control inputs 170. In one non-limiting example, aspects described herein can be incorporated as a portion of a control loop-based control schema.

In another non-limiting example, the power converter 32 can include a set of energy storage components, or energy "reservoirs", such as capacitors, inductors, or a combination thereof (not shown). In this example, the energy storage components can be used to utilized to supply a higher current than the power converter is able to sustain alone, for a short period of time (e.g. the capacitor discharge time). In this example, the controller module 160 can be configured to allow or provide for a slightly higher maximum threshold for the power converter 32 for that limited period of time, which can affect the determined maximum current values provided to the respective SSPCs 134, 136, 138. In yet another non-limiting example, some electrical loads 20 can exhibit a high transient power demand during start up periods, and thus the controller module 160 can controllably stagger or order the start up or power up events for a subset of electrical loads 20 (for example, via the control input 170 to the subset of SSPCs 134, 136, 138) to reduce or manage peak current demand of the power distribution node 116.

Figure 4:
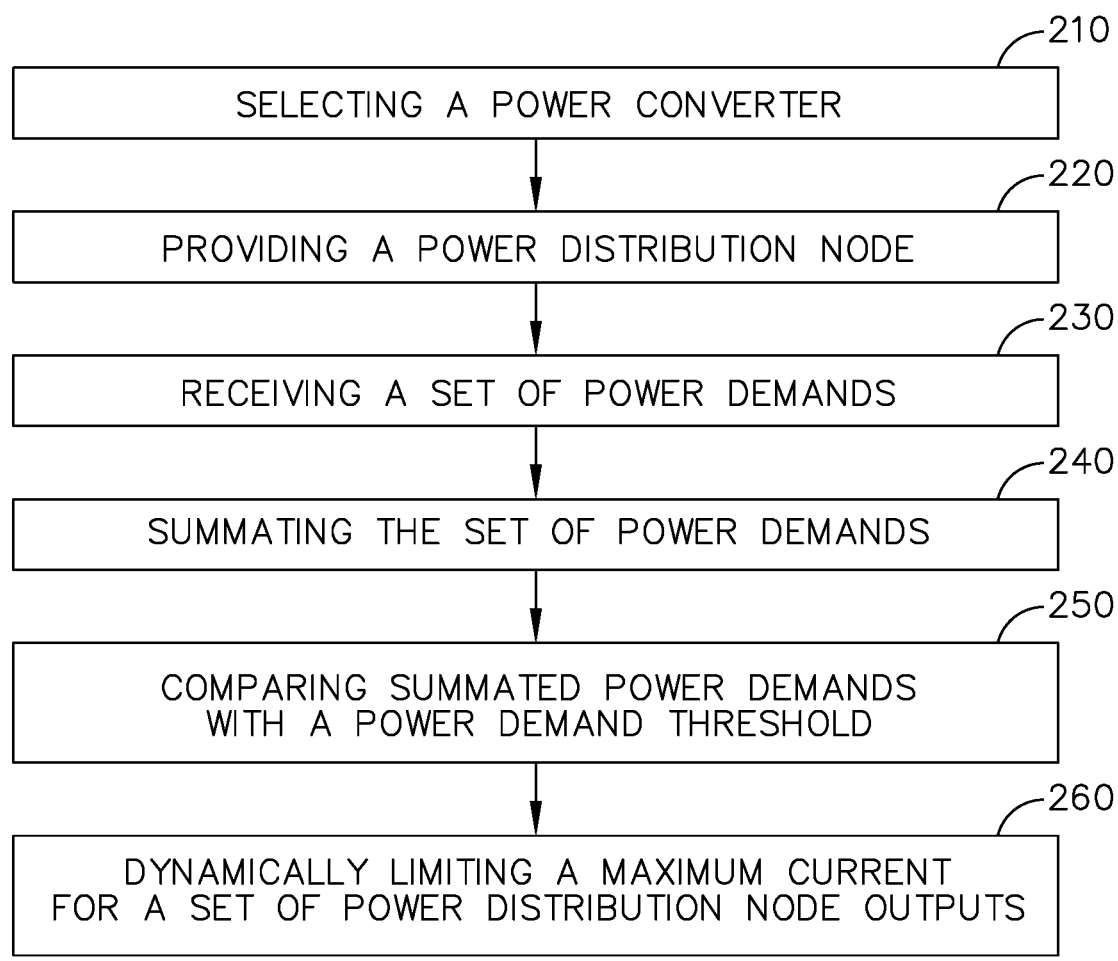
FIG. 4 is diagram of demonstrating a method of operating the power distribution system in accordance with various aspects described herein.

FIG. 4 illustrates a flow chart demonstrating a method 200 of operating a power distribution system 130. The method 200 begins by selecting a power converter 32 having a power demand threshold at 210. Next, the method 200 proceeds to providing a power distribution node 16, 116 including the selected power converter 32 and a set of solid state switching elements 34, 36, 38, 134, 136, 138 at 220. The method 200 then includes receiving, in the controller module 160, a set of present power demands from the set of solid state switching elements 34, 36, 38, 134, 136, 138 at 230.

Next, the controller module 160 can summate the set of present power demands at 240. The method 200 can continue to comparing the summated set of present power demands with the power demand threshold of or associated with the power converter 32, at 250. Finally, when the comparison satisfies the power demand threshold of the power converter 32, the controller module 160 can dynamically limit a maximum current for at least a subset of solid state switching elements 34, 36, 38, 134, 136, 138, as needed, at 260.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. In one non-limiting example, the method 200 can include prioritizing the set of solid state switching elements 34, 36, 38, 134, 136, 138, or dynamically limiting the maximum current for the at least a subset of the solid state switching elements 34, 36, 38, 134, 136, 138 occurs in accordance with the prioritization.

Many other possible aspects and configurations in addition to that shown in the above figures are contemplated by the present disclosure. Additionally, the design and placement of the various components can be rearranged such that a number of different in-line configurations could be realized. In another non-limiting example, the prioritizing can include prioritizing the set of solid state switching elements 34, 36, 38, 134, 136, 138 based on an electrical load 20 connected with the respective set of solid state switching elements 34, 36, 38, 134, 136, 138. In yet another non-limiting example, the method 200 can include identifying a high power transient demand in the set of solid state switching elements 34, 36, 38, 134, 136, 138, for instance, by way of the sensor 150, and upon identification of the high power transient demand, dynamically raising the maximum current for the respective solid state switching element 34, 36, 38, 134, 136, 138 associated with the high power transient demand. In another non-limiting example, the limiting of the maximum current for the subset of solid state switching elements 34, 36, 38, 134, 136, 138 can prevent tripping of the subset of solid state switching elements 34, 36, 38, 134, 136, 138. In yet another non-limiting example, when the comparison satisfies the power demand threshold, the dynamically limiting limits the total actual power supplied by the power converter (that is, power actually supplied via the set of SSPCs 34, 36, 38, 134, 136, 138 to the respective electrical loads 20) to less than or equal to the maximum power demand threshold of the power converter 32.

The aspects disclosed herein provide a method and apparatus for operating a power distribution system or a power distribution node. The technical effect is that the above described aspects enable operations of the power distribution node or system without exceeding a power threshold of the power converter 32. One advantage that can be realized in the above aspects of the disclosure is that the above described aspects minimizes the power converter ratings. For example, for a given set of high power transient demands, the aspects described herein minimize stress on a given power converter, or minimizes a designed or rated power characteristics of the power converter. Many loads exhibit a transient current demand, typically at switch on or equivalent mode change (e.g. switching on or off), which is much higher than the current demand whilst operating continuously. If a power source is feeding a number of electrical loads, then it must have the capacity to meet all such transient demands without adversely affecting any of the other loads, which is liable to increase the size of energy storage components (e.g. inductors, capacitors, etc.), thereby offsetting the wiring weight reductions of utilizing smaller components. In the current disclosure, as energy storage requirement increases are not required, or can be reduced or minimized, as the power converter ratings are not exceeded due to the operations schema, and hence improves the effective performance to weight ratio of the power converter.

In another non-limiting advantage, the current disclosure allows for or enables the electrical protection from the power converter being overloaded by transient current demands to the extent that it receives or is demanded from during operations, as explained herein. Thus, aspects of the disclosure can enable the power system designer to minimize the volume, weight and cost of the power converter to achieve a competitive advantage. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a power distribution system including a power converter having a maximum power demand threshold, comprising:
   identifying a high power transient demand in a set of solid state switching elements;
   upon identification of the high power transient demand, raising a current trip rating for the respective solid state switching element associated with the high power transient demand;
   receiving, in a controller module, a set of present power demands from the set of solid state switching elements;
   summating the set of present power demands in the controller module;
   comparing the summated set of present power demands with the maximum power demand threshold; and
   when the summated set of present power demands exceeds the maximum power demand threshold, limiting a maximum current for at least a subset of solid state switching elements;

wherein the set of solid state switching elements are connected downstream of the power converter; and wherein the limiting limits a total power supplied by the power converter to less than or equal to the maximum power demand threshold.

2. The method of claim 1 further comprising prioritizing the set of solid state switching elements.

3. The method of claim 2 wherein limiting the maximum current for the at least a subset of the solid state switching elements occurs in accordance with the prioritizing the solid state switching elements.

4. The method of claim 2 wherein the prioritizing includes prioritizing the set of solid state switching elements based on an electrical load connected with the set of solid state switching elements.

5. The method of claim 1 wherein, when the summated set of present power demands exceeds the maximum power demand threshold, limiting the maximum current for at least another subset of the solid state switching elements.

6. The method of claim 1 further comprising, upon identification of the high power transient demand, limiting the maximum current for the respective solid state switching element associated with the high power transient demand.

7. The method of claim 1 wherein limiting the maximum current for the subset of solid state switching elements prevents tripping of the subset of solid state switching elements.

8. A power distribution system, comprising:
a power converter adapted to receive a power supply and convert the power supply to a power output;
a set of solid state switching elements connected with the power output;
a set of sensors adapted to sense a power demand at the set of solid state switching elements; and
a controller module communicatively connected with the set of sensors and the set of solid state switching elements;
wherein the controller module is adapted to identify a high power transient demand in the set of solid state switching elements, and upon identification of the high power transient demand, raise a current trip rating for the respective solid state switching element associated with the high power transient demand, obtain the set of sensed power demands, summate the set of sensed power demands, compare the summated sensed power demands with a maximum power demand threshold for the power converter, and when the summated set of sensed power demands exceeds the maximum power demand threshold, controllably limit a maximum current for at least a subset of solid state switching elements, wherein the limiting limits a total power supplied by the power converter to less than or equal to the maximum power demand threshold.

9. The power distribution system of claim 8 wherein the set of sensors are current sensors.

10. The power distribution system of claim 8 wherein the power demand threshold is a current demand threshold.

11. The power distribution system of claim 8 wherein the set of solid state switching elements include a respective set of maximum current thresholds.

12. The power distribution system of claim 11 wherein the controller module is further adapted to controllably increase at least a subset of the maximum current thresholds in response to a high power transient demand in a respective subset of solid state switching elements.

13. A method of operating a power distribution system, comprising:
identifying a high power transient demand in a set of solid state switching elements;
upon identification of the high power transient demand raising a current trip rating for a respective solid state switching element associated with the high power transient demand;
receiving, in a controller module, a set of power demands from a set of power sensors associated with a respective set of controllably switchable elements;
comparing the set of power demands with a maximum power demand criteria; and
when the power demands exceed the maximum power demand criteria, controllably limiting, by the controller module, at least a subset of switchable elements such that a maximum delivered power from a power converter remains less than the maximum power demand criteria.

14. The method of claim 13 wherein the set of controllably switchable elements define a respective set of maximum current thresholds, and wherein controllably limiting includes altering at least a subset of maximum current thresholds in a corresponding subset of switchable elements.

15. The method of claim 13 wherein the maximum power demand criteria includes at least one of an average power, a temporal power demand, a summation of the set of power demands from a set of power sensors, or an individual threshold value for a respective switchable element.

* * * * *